(12) United States Patent
Zhang et al.

(10) Patent No.: US 10,956,900 B2
(45) Date of Patent: Mar. 23, 2021

(54) CROSS-ASSET TRADING WITHIN BLOCKCHAIN NETWORKS

(71) Applicant: Advanced New Technologies Co., Ltd., Grand Cayman (KY)

(72) Inventors: Wenbin Zhang, Hangzhou (CN); Hao Lei, Hangzhou (CN); Lichun Li, Hangzhou (CN); Zhangjie Huang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/448,808

(22) Filed: Jun. 21, 2019

(65) Prior Publication Data

US 2019/0311351 A1 Oct. 10, 2019

Related U.S. Application Data

(63) Continuation of application No. PCT/CN2019/074057, filed on Jan. 31, 2019.

(51) Int. Cl.
*G06Q 20/00* (2012.01)
*G06Q 20/36* (2012.01)
(Continued)

(52) U.S. Cl.
CPC ......... *G06Q 20/36* (2013.01); *G06F 16/1824* (2019.01); *G06F 16/1834* (2019.01);
(Continued)

(58) Field of Classification Search
CPC ........ G06Q 20/36; G06Q 40/04; G06Q 20/10; G06Q 20/065; G06Q 20/223;
(Continued)

(56) References Cited

U.S. PATENT DOCUMENTS

2016/0342978 A1* 11/2016 Davis .................. G06Q 20/02
2016/0350552 A1   12/2016 Matsuzaki et al.
(Continued)

FOREIGN PATENT DOCUMENTS

CN   108335106   7/2018
RU   2673842     11/2018
(Continued)

OTHER PUBLICATIONS

Freeman, Homomorphic Encryption and the BGN Cryptosystem, Nov. 18, 2011, pp. 2-3.*

(Continued)

*Primary Examiner* — Patrick McAtee
*Assistant Examiner* — John M Winter
(74) *Attorney, Agent, or Firm* — Fish & Richardson P.C.

(57) ABSTRACT

Implementations are directed to cross-asset trading in blockchain networks, and include a first node providing transaction information based on a first value, a second value, and an exchange rate of a second node, receiving, from the second node, a first evidence set, a first range proof, and a digital signature of the second node, and submitting the transaction for verification based on the first range proof, a second range proof, the first evidence set, a second evidence set, a digital signature of the first node, and the digital signature of the second node, the transaction being executed to decrease a balance of the first node by the first value, increase a first balance of the second node by the first value, decrease a second balance of the second node by the second value, and increase a balance of the third node by the second value.

27 Claims, 6 Drawing Sheets

(51) Int. Cl.
| | |
|---|---|
| *G06F 16/182* | (2019.01) |
| *G06Q 20/06* | (2012.01) |
| *H04L 9/06* | (2006.01) |
| *H04L 9/30* | (2006.01) |
| *H04L 9/32* | (2006.01) |
| *G06Q 40/04* | (2012.01) |
| *G06Q 20/10* | (2012.01) |
| *G06Q 20/22* | (2012.01) |

(52) U.S. Cl.
CPC ....... *G06Q 20/065* (2013.01); *G06Q 20/0658* (2013.01); *G06Q 20/10* (2013.01); *G06Q 20/223* (2013.01); *G06Q 40/04* (2013.01); *H04L 9/0618* (2013.01); *H04L 9/0643* (2013.01); *H04L 9/30* (2013.01); *H04L 9/3218* (2013.01); *H04L 9/3239* (2013.01); *H04L 9/3247* (2013.01); *G06Q 2220/00* (2013.01); *H04L 2209/38* (2013.01); *H04L 2209/56* (2013.01)

(58) Field of Classification Search
CPC ........... G06Q 20/0658; G06Q 2220/00; G06Q 20/3825; G06Q 20/3829; G06Q 20/3823; H04L 9/3239; H04L 9/0618; H04L 9/0643; H04L 9/30; H04L 9/3218; H04L 9/3247; H04L 2209/38; H04L 2209/56; G06F 16/1824; G06F 16/1834
USPC .......................................................... 705/69
See application file for complete search history.

(56) References Cited

U.S. PATENT DOCUMENTS

| | | | |
|---|---|---|---|
| 2018/0189877 | A1 | 7/2018 | Uhr et al. |
| 2019/0043043 | A1* | 2/2019 | Saraniecki ............ H04L 9/3239 |
| 2019/0385162 | A1* | 12/2019 | Zhang .................... H04L 63/04 |

FOREIGN PATENT DOCUMENTS

| | | |
|---|---|---|
| WO | 2017079652 | 5/2017 |
| WO | 2017090041 | 6/2017 |
| WO | WO 2018140830 | 8/2018 |
| WO | WO 2018186874 | 10/2018 |

OTHER PUBLICATIONS

Extended European Search Report in European Application No. 19717101.0, dated Apr. 3, 2020, 9 pages.

Park, "Towards Secure Quadratic Voting," IACR, International Association for Cryptologic Research, Apr. 2016, pp. 1-31.

PCT International Search Report and Written Opinion in International Application No. PCT/CN2019/074057, dated Nov. 13, 2019, 6 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Groth et al., "Perfect Non-interactive Zero Knowledge for NP," Eurocrypt, 2006, pp. 339-358.

Mitsunaga et al., "Efficient Secure Auction Protocols Based on the Boneh-Goh-Nissim Encryption," IEICE Trans. Fundamentals, 2013, 96(1):68-75.

* cited by examiner

CROSS-ASSET TRADING WITHIN BLOCKCHAIN NETWORKS

CROSS-REFERENCE TO RELATED APPLICATIONS

This application is a continuation of PCT Application No. PCT/CN2019/074057, filed on Jan. 31, 2019, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. Example types of blockchain networks can include public blockchain networks, private blockchain networks, and consortium blockchain networks. A public blockchain network is open for all entities to use the DLS, and participate in the consensus process. A private blockchain network is provided for a particular entity, which centrally controls read and write permissions. A consortium blockchain network is provided for a select group of entities, which control the consensus process, and includes an access control layer.

Blockchain networks can be used for trading value through the transfer and exchange of digital assets, such as currencies. Several different types of digital assets can be exchanged within a blockchain network by transferring the digital assets from one node of a blockchain network to another node. In some instances, transferring digital assets within a blockchain network involves the exchange of one type of digital asset for a second type of digital asset based on an exchange rate.

Participants in a blockchain network, however, may desire privacy in their transactions, such that other participants, including consensus nodes are unaware of details of the transaction (e.g., transaction amounts, exchange rates). To provide privacy, encryption schemes can be used. However, some encryption schemes do not support multiplication operations, such as homomorphic multiplication. Although some encryption schemes to support such multiplication operations, they are limited to only a single multiplication operation. This inhibits the ability of participants in a cross-asset transaction that includes, for example, an exchange rate, to maintain privacy of the exchange rate.

SUMMARY

Implementations of this specification include computer-implemented methods for transferring currency within a blockchain network. More particularly, implementations of this specification are directed to cross-asset transactions within a blockchain network using encrypted transaction data and encrypted exchange rates.

In some implementations, actions include generating, by a first node in the blockchain network and using Boneh-Goh-Nissim (BGN) encryption, ciphertexts based on a first value, and a second value, the second value being determined based on the first value and an exchange rate provided by a second node in the blockchain network, transmitting, by the first node to the second node, the first value and the ciphertexts, receiving, by the first node and from the second node, a first evidence set including a set of data that can be used to verify the exchange rate in a zero-knowledge proof (ZKP) routine without revealing the exchange rate, generating, by the first node, a second evidence set including a set of data that can be used to verify, using the ZKP routine, that the ciphertexts are encrypted by a BGN public key of the first node, defining, by the first node, a transaction including a first transaction between the first node and the second node for transfer of the first value from the first node to the second node, and a second transaction between the second node and a third node for transfer of the second value from the second node to the third node, and transmitting, by the first node, the transaction to at least one consensus node of the blockchain network for verification and execution of the transaction, the transaction being verified based on the first evidence set, and the second evidence set, and in response to verifying the transaction, executing the first transaction and the second transaction to decrease a balance of the first node by the first value, increase a first balance of the second node by the first value, decrease a second balance of the second node by the second value, and increase a balance of the third node by the second value. Other implementations include corresponding systems, apparatus, and computer programs, configured to perform the actions of the methods, encoded on computer storage devices.

These and other implementations may each optionally include one or more of the following features: the first evidence set is provided by the second node based on the first value, a pair of random numbers provided by the first node, and the ciphertexts; verifying the transaction by the at least one consensus node includes verifying a digital signature of the first node and a digital signature of the second node; verifying the transaction by the at least one consensus node includes verifying a first range proof provided by the first node and a second range proof provided by the second node; the first range proof includes a ZKP to prove that the first value is greater than zero, and that the balance of the first node is greater than or equal to the first value; the second range proof includes a ZKP to prove that the second balance of the second node is greater than or equal to the second value; the transaction further includes a data set including a set of ciphertexts generated at least partially based on BGN encryption, the data set being used to verify the transaction by the at least one consensus node; actions further include receiving, by the first node, the exchange rate from the second node through a sub-chain channel of the blockchain network; at least one ciphertext of the ciphertexts is provided using Pedersen Commitment; the set of data of the first evidence set includes a first data value and a second data value, each of the first data value and the second data value being determined based on parameters used to generate a BGN public key of the second node; and the set of data of the second evidence set includes a set of ciphertexts and a set of values, each value in the set of values being at least partially based on a hash of the set of ciphertexts This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Figure 1:
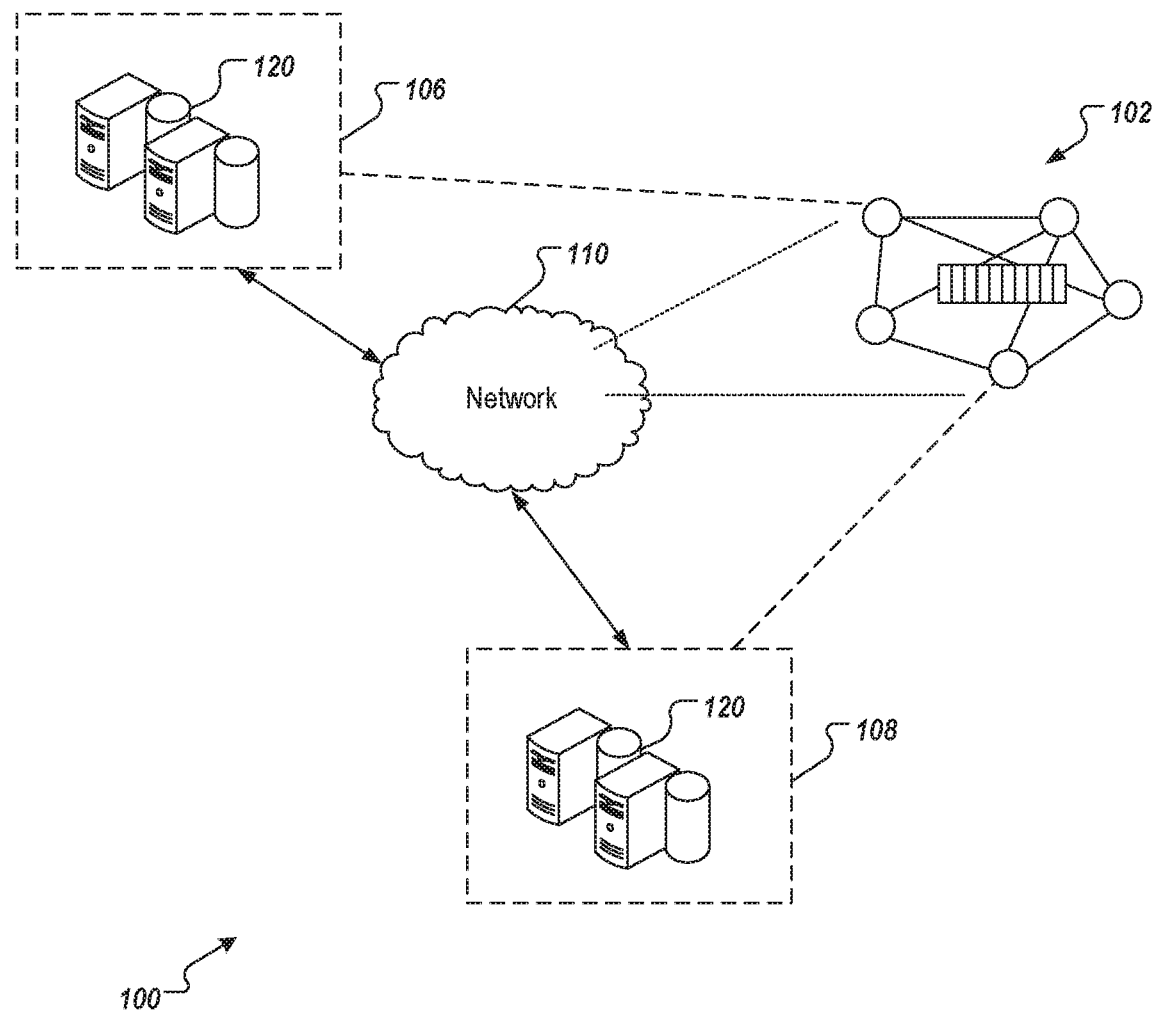
FIG. 1 depicts an example of an environment that can be used to execute implementations of this specification.

Implementations of this specification include computer-implemented methods for transferring assets within a blockchain network. More particularly, implementations of this specification are directed to cross-asset transactions within a blockchain network using encrypted transaction data and encrypted exchange rates.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. A consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

As introduced above, a blockchain network can be provided as a public blockchain network, a private blockchain network, or a consortium blockchain network. Implementations of this specification are described in further detail herein with reference to a consortium blockchain network. It is contemplated, however, that implementations of this specification can be realized in any appropriate type of blockchain network. Although techniques described in this specification are indicated as being relevant to consortium blockchain networks, the techniques can also be used, with or without changes, in other types of blockchain networks, including public blockchain networks and private blockchain networks.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. Example consensus protocols include, without limitation, practical Byzantine fault tolerance (PBFT), proof-of-work (POW), proof-of-stake (POS), and proof-of-authority (POA).

Consortium blockchain networks can be used to conduct transfers and exchanges of digital assets. In some instances, a digital asset can represent a real-world asset. In some instances, a digital asset can represent a virtual asset. For example, virtual assets can represent real-world value, and that can be used to purchase products, and/or services. Virtual assets are provided as an alternative to real-word, physical assets (e.g., Chinese RMB, US dollar). Conducting transactions within a consortium blockchain network provides added security, as the consortium blockchain network verifies, and immutably records the transaction. Implementations of this specification are described in further detail herein with reference to currencies (e.g., RMB, USD). However, it is contemplated that implementations can be realized with any appropriate digital asset.

FIG. 1 depicts an example of an environment 100 that can be used to execute implementations of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
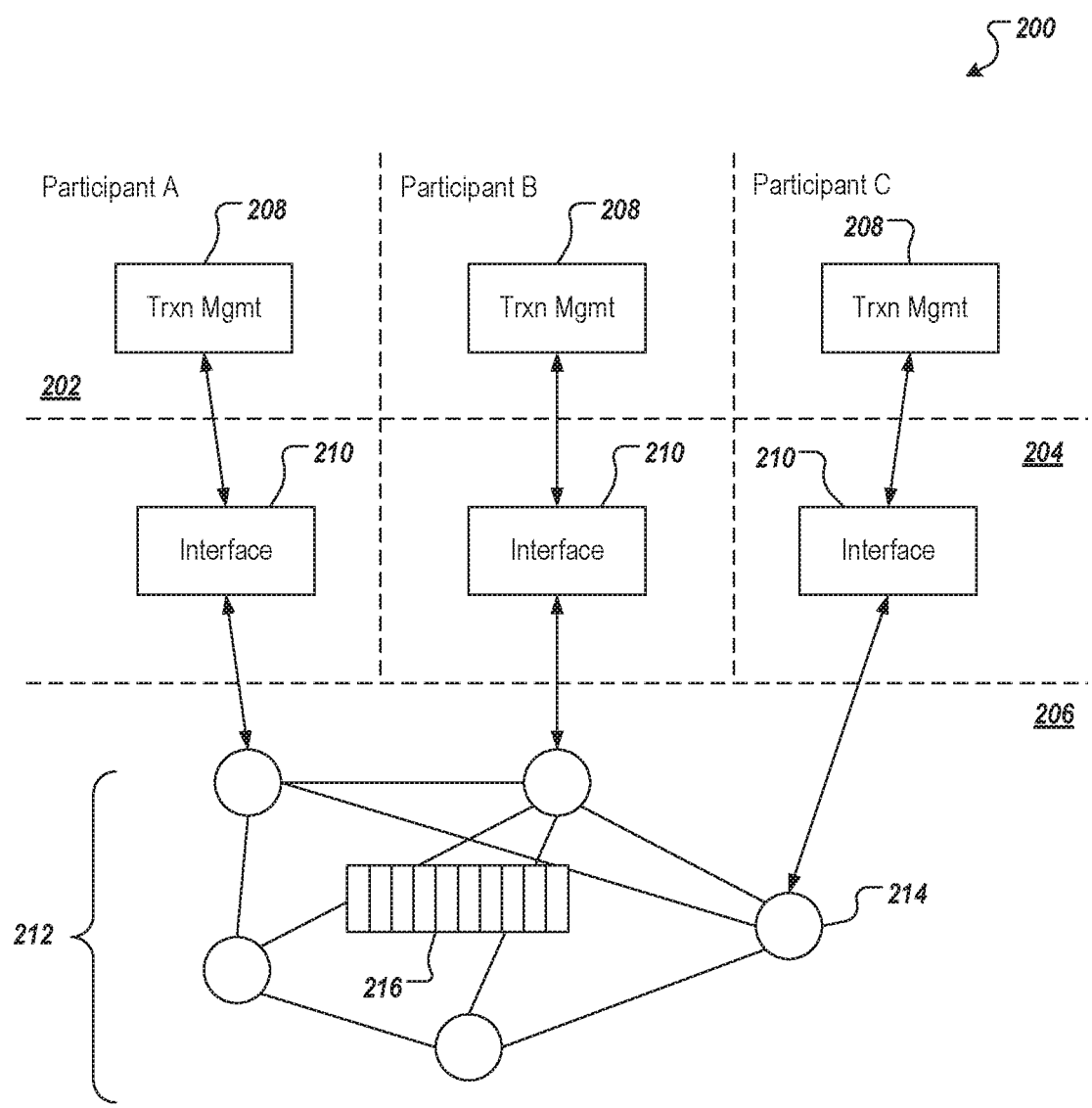
FIG. 2 depicts an example of a conceptual architecture in accordance with implementations of this specification.

FIG. 2 depicts an example of a conceptual architecture 200 in accordance with implementations of this specification. The conceptual architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

As with transfers of real-world, physical currencies, effectively transferring a digital representation of a currency sometimes requires the transferee to exchange a first type of currency for a second type of currency. For example, a first member of a consortium blockchain network (e.g., Participant A) having only a first type of currency (e.g., US dollars ($)) may want to transfer currency to a second member of the consortium blockchain network (e.g., Participant C) in a second type of currency (e.g., Chinese RMB). In order for Participant A to transfer value to Participant C, an amount of the first type of currency is exchanged for an equivalent value of the second type of currency prior to the transfer to Participant C.

In accordance with implementations of this specification, and as described in further detail herein, exchanging types of currencies can be achieved through a third member of the consortium blockchain network (e.g., Participant B) as an intermediary. For example, Participant A can transfer an amount of the first type of currency to Participant B, and Participant B can transfer to Participant C an amount of the second type of currency having an equivalent value based on an exchange rate (ER) used by the Participant B. In some examples, Participant B is a financial institution that provides currency exchange services to members of a consortium blockchain network.

In order to ensure the privacy of the parties involved in currency exchanges within blockchain networks, the transaction data underlying the exchanges are encrypted prior to verification and publication of the exchange within the blockchain network. In some examples, transaction data includes the transferred amount of the first currency ($t_1$) and the amount of a second currency ($t_2$) provided in exchange for the first amount. Typically, transaction data submitted to the blockchain for verification is encrypted using a homomorphic encryption scheme, such as Boneh-Goh-Nissim (BGN) encryption. Under homomorphic encryption schemes, two or more items of encrypted data may be added together without limitation. Unlike other encryption schemes (e.g., Paillier public key encryption (PKE)), BGN encryption enables homomorphic multiplication over two ciphertexts (e.g., multiplication of encrypted β and encrypted $t_1$). However, data items encrypted using homomorphic encryption are limited to a single multiplication. This is because multiplicative pairing of two data items encrypted using homomorphic encryption generates an encrypted product that is of a different order than the encrypted multipliers.

The equation below demonstrates the one-time nature of multiplicative homomorphism, which is usually called pairing on elliptic curve $\mathcal{G}$:

$$e: \mathcal{G} \times \mathcal{G} \to \mathcal{G}_1$$

where each of the encrypted data items being multiplied are on a different elliptic curve $\mathcal{G}$ than the product of the multiplication which is on $\mathcal{G}_1$. Encrypted data items generated by multiplicative homomorphism cannot be further multiplied or divided due to this change of the underlying elliptic curves. In addition, encrypted data items generated by multiplicative homomorphism cannot be compared with data items generated by direct homomorphic encryption. For example, the first two encrypted data items in the above equation on the same elliptic curve $\mathcal{G}$ can be compared with one another, but cannot be compared with the third encrypted data item on elliptic curve $\mathcal{G}_1$ generated by multiplicative homomorphism due to the difference in the underlying elliptic curves $\mathcal{G}$ and $\mathcal{G}_1$.

In BGN encryption, each participant i that is to use BGN encryption is provided with a BGN public key (PK), private key (SK) pair (e.g., $PK_{BGN\_i}$, $SK_{BGN\_o}$) through a key generation process. Through the key generation process, the following is provided:

$$PK_{BGN_i} = \{N, \mathcal{G}, \mathcal{G}_1, e, P, Q\}_i$$

$$SK_{BGN\_i} = p$$

where:

N=pq p, q are large prime numbers $\mathcal{G}$ an elliptic curve of order N e: $\mathcal{G} \times \mathcal{G} \rightarrow \mathcal{G}_1$ is a pairing P∈$\mathcal{G}$ a generator Q=qαP (a random generator of a subgroup of $\mathcal{G}$ whose order is p)

α<N

In the context of this specification, under homomorphic encryption schemes, exchange transactions involving a public exchange rate can be verified and recorded by a consortium blockchain network without revealing or publishing the transferred amount, and/or the exchanged amounts. For example, both the amount of a first currency ($t_1$) transferred by Participant A to exchange service provider Participant B, and the amount of a second currency ($t_2$) provided by Participant B in exchange for the first amount can be encrypted using homomorphic encryption. Under this scheme, both encrypted $t_1$ and encrypted $t_2$ are on elliptic curve $\mathcal{G}$. The encrypted transfer amount $t_1$ can be multiplied by a public exchange rate of Participant B to determine the amount of the second currency that should be provided by Participant B in exchange for $t_1$. Because Participant B's exchange rate is a public, non-encrypted value in this example, the product of $t_1$ and the public exchange rate is an encrypted data item that is one the same elliptic curve $\mathcal{G}$ as $t_1$. The exchange transaction between Participant A and Participant B can be verified by the blockchain network by comparing the encrypted product of $t_1$ and the public exchange rate with the encrypted data item $t_2$. If the encrypted product of $t_1$ multiplied by the public exchange rate is equal to the encrypted data item $t_2$, then the transaction is verified, and is recorded on the blockchain.

While this verification scheme provides an effective means for verifying exchange transactions involving public exchange rates, blockchain network members that provide currency exchange services are often in competition with other such providers. Consequently, they do not want their exchange rates public within the blockchain network. Therefore, it is desirable that the exchange rate, as well as the transaction data, be encrypted for exchange transactions conducted within and verified by a blockchain network.

However, when using the verification described above, the limitation of one-time multiplication for homomorphic encryption creates a barrier to verification of exchange transactions, in which both the transaction data and the exchange rate are encrypted using homomorphic encryption. For example, the amount of a first currency ($t_1$) transferred by Participant A to exchange service provider Participant B, the amount of a second currency ($t_2$), for which the transferred amount of the first currency was exchanged by Participant B, and the exchange rate (β) of Participant B can each be encrypted using homomorphic encryption. Under this scheme, encrypted $t_1$, encrypted $t_2$, and encrypted β are all on the same elliptic curve $\mathcal{G}$.

As discussed above, whenever the exchange rate involved in the exchange transaction is public, the exchange transaction can be verified by the blockchain network by comparing the product of $t_1$ and a public exchange rate with the encrypted data item $t_2$. However, when the exchange rate is encrypted (β), the product of $t_1$ and the encrypted exchange rate (β) is on elliptic curve $\mathcal{G}_1$, which differs from the underlying curve $\mathcal{G}$ of $t_2$. Based on this difference in order resulting from multiplicative homomorphism, the product of $t_1$ multiplied by the encrypted exchange rate (β) cannot be compared to $t_2$. As a result, under current verification schemes, verification of exchange transactions involving encryption of both the transaction data and the exchange rate cannot be conducted within a blockchain network.

In view of the above context, and as described in further detail herein, implementations of this specification are directed to cross-asset trading within a blockchain network using encrypted transaction data and encrypted exchange rates. More particularly, the cross-asset trading platform of this specification enables transactions that can be conducted with private (encrypted) exchange rate verification.

Figure 3:
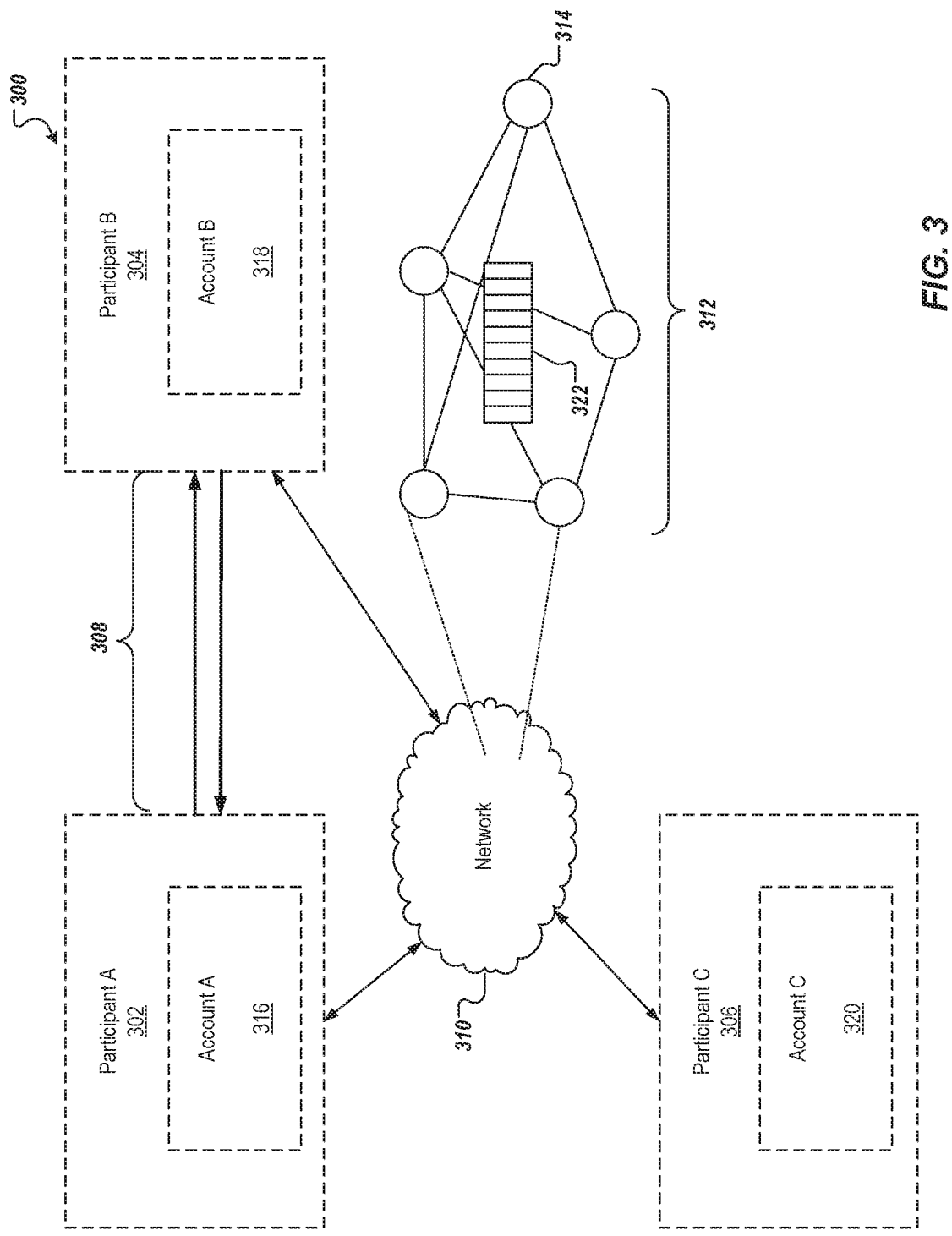
FIG. 3 depicts an example of a cross-asset trading platform in accordance with implementations of this specification.

FIG. 3 depicts an example of a cross-asset trading platform 300 in accordance with implementations of this specification. In the depicted example, the example cross-asset trading platform 300 includes three participants, Participant A, Participant B, and Participant C, associated with respective devices 302, 304, 306. The example cross-asset trading platform 300 also includes a sub-chain channel 308, a network 310, and a consortium blockchain network 312.

In some examples, the network 310 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

As described herein, the blockchain network 312 is provided as a peer-to-peer network including a plurality of nodes 314 that immutably record information in a blockchain 322. Although a single blockchain 322 is schematically depicted, multiple copies of the blockchain 322 are provided, and are maintained across the blockchain network 312. For example, each node 314 stores a copy of the blockchain 322. In some implementations, the blockchain 322 stores information associated with transactions that are performed between two or more entities participating in the consortium blockchain network 312. In some examples, the devices 302, 304, 306 are part of respective nodes 314 in the consortium blockchain network 312.

In some implementations, the device 302, the device 304, and the device 306 include respective accounts, Account A 316, Account B 318, and Account C 320. In some examples, Account A 316, Account B 318, and Account C 320 store financial assets. In some examples, Account A 316, Account B 318, and Account C 320 store amounts of one or more types of currency.

In some implementations, sub-chain channel 308 can be used to transfer information outside the blockchain network 312 between two members of the consortium blockchain network 312. In some examples, private financial information can be transferred from one member of the consortium blockchain network 312 to another member of the consortium blockchain network 312 outside the blockchain network 312 over the sub-chain channel 308. For example, the device 304 can transfer a private exchange rate (β) to the device 302 outside of the blockchain network 312 by transmitting the exchange rate over the sub-chain channel 308.

In some examples, a transaction between two or more members of the consortium blockchain network 312 can be submitted to the blockchain network 312 for verification and recordation. In some examples, an asset (e.g., currency) exchange transaction between two or more members of the consortium blockchain network 312 can be submitted to the blockchain network 312 for verification of the exchange. In some examples, the transaction information submitted to the blockchain network 312 is encrypted. In some examples, transaction information submitted to the blockchain network 312 is encrypted using homomorphic encryption. In some examples, transaction information includes an exchange rate, a first amount to be transferred, and a second amount to be transferred. In some examples, the second amount to be transferred is equal to the product of the first amount multiplied by the exchange rate.

Figure 4:
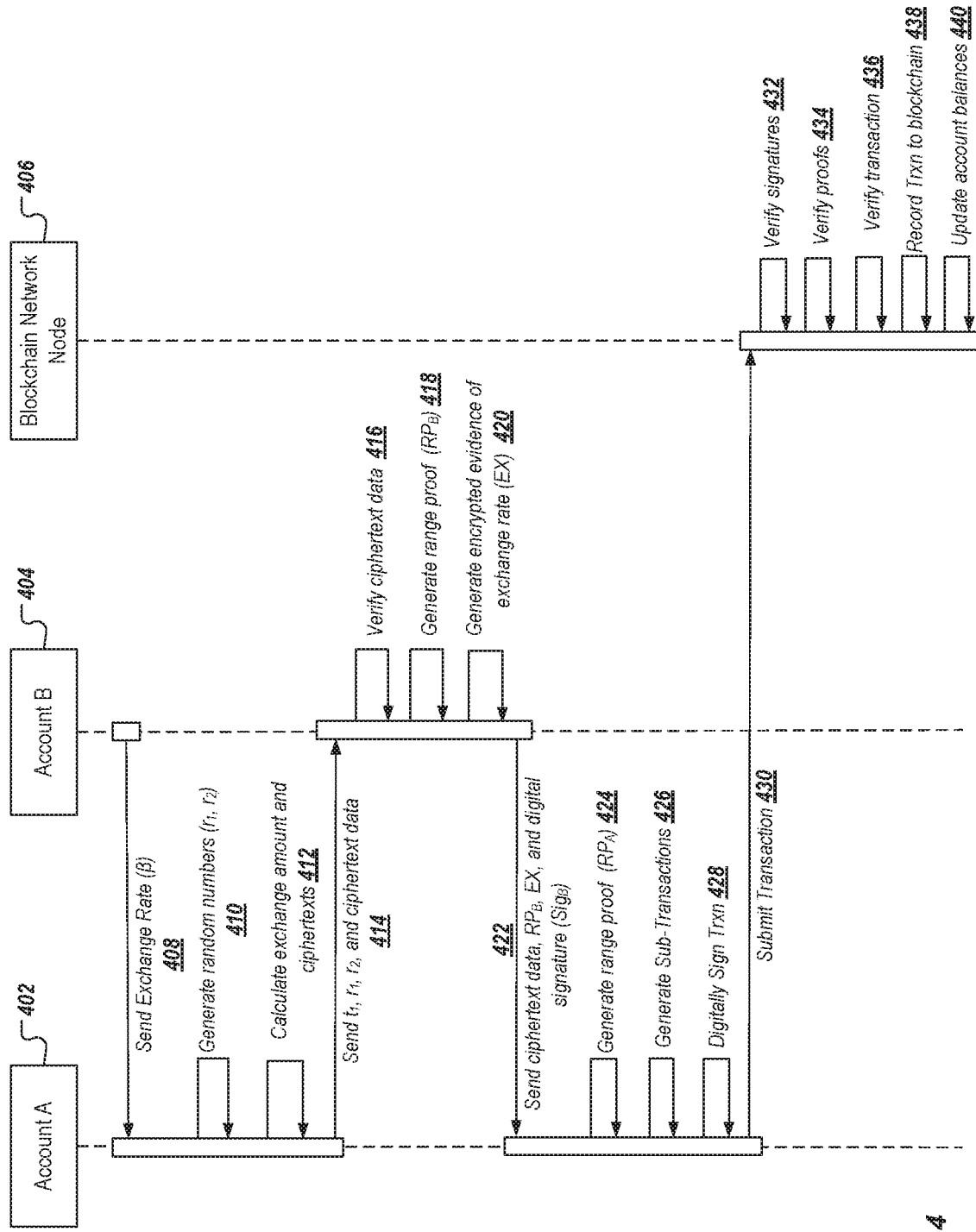
FIG. 4 depicts an example of a signal diagram for executing a cross-asset transaction in accordance with implementations of this specification.

FIG. 4 depicts an example of a signal diagram 400 for executing a cross-asset transaction in accordance with implementations of this specification. The signal diagram 400 of FIG. 4 includes an Account A 402 (e.g., a node in a blockchain network), an account B 404 (e.g., a node in the blockchain network), and a consensus node 406 of the blockchain network. In some examples, the Account A 402 and the Account B 404 are used to manage assets of participants in the blockchain network (e.g., Participant A and Participant B, respectively). In some examples, the Account A 402 and the Account B 404 store digital assets of the Participant A and Participant B, respectively. In some examples, Participant B is a financial institution.

An example of a cross-asset transaction is described in further detail herein with reference to FIG. 4. In the example transaction, an amount ($t_1$) in a first currency (e.g., USD) is transferred from the Account A to an account of another participant in the blockchain network (e.g., Participant C) in an amount ($t_2$) in a second currency (e.g., RMB). The amount ($t_1$) is transferred using the Account B 404, an intermediary, which provides a private exchange rate ($\beta$) between the first currency and the second currency. The Account A 402 includes a balance amount ($s_A$), which is a balance of value in the first currency that the Account A 402 has available. The Account B 404 includes a first balance amount ($s_{B_1}$), which is a balance of value in the first currency that the Account B 404 has available, and a second balance amount ($s_{B_2}$), which is a balance of value in the second currency that the Account B 404 has available.

In the example cross-asset transaction, the private exchange rate ($\beta$) is transmitted (408) from the Account B 404 to the Account A 402. The message conveying the private exchange rate may be transmitted over a network. In some examples, the message conveying the private exchange rate is transmitted over a sub-chain channel (e.g., the sub-chain channel 308 of FIG. 3).

The Account A 402 generates (410) two random numbers ($r_1$, $r_2$). The Account A 402 calculates (412) an exchange amount ($t_2$) and sets of ciphertexts ($X_1$, $Y_1$, $Z_1$), and ($X_2$, $Y_2$, $Z_2$). In some implementations, the exchange amount ($t_2$) is equal to the product of the amount ($t_1$) to be transferred and the private exchange rate ($\beta$) as shown below:

$$t_2 = \beta t_1$$

In some implementations, the sets of ciphertexts ($X_1$, $Y_1$, $Z_1$), and ($X_2$, $Y_2$, $Z_2$) are determined based on a commitment scheme, and an encryption scheme. An example commitment scheme includes, without limitation, Pedersen Commitment (PC). An example encryption scheme includes, without limitation, BGN encryption. For BGN encryption, each participant includes a BGN public key (PK), private key (SK) pair. For example, the Account A 402 has a BGN PK-SK pair (e.g., $PK_{BGN\_A}$, $SK_{BGN\_A}$) assigned thereto, the Account B 404 has a BGN PK-SK pair (e.g., $PK_{BGN\_B}$, $SK_{BGN\_B}$) assigned thereto, and the Account C (not depicted in FIG. 4) has a BGN PK-SK pair (e.g., $PK_{BGN\_C}$, $SK_{BGN\_C}$) assigned thereto.

In some implementations, the sets of ciphertexts ($X_1$, $Y_1$, $Z_1$), and ($X_2$, $Y_2$, $Z_2$) are respectively determined as:

$$(X_1,Y_1,Z_1)=(PC(t_1,r_1),BGN_A(t_1,r_1),BGN_B(t_1,r_1))$$

$$(X_2,Y_2,Z_2)=(PC(t_2,r_2),BGN_B(t_2,r_2),BGN_C(t_2,r_2))$$

The notation PC(t, r) indicates the Pedersen Commitment of t with random number r as the blind factor. The notation $BGN_A$ indicates BGN encryption using the public key of the Account A 402, the notation $BGN_B$ indicates BGN encryption using the public key of the Account B 404, and the notation $BGN_C$ indicates BGN encryption using the public key of the Account C. In some examples, the Account A 402 provides a balance ciphertext as:

$$(PC(s_A,\bar{r}_A),BGN_A(s_A,\bar{r}_A))$$

where $\bar{r}_A$ is a random number generated by the Account A 402.

Sub-sets of ciphertexts ($X_1$, $Z_1$), and ($X_2$, $Y_2$), the random numbers ($r_1$, $r_2$), and the amount ($t_1$) are sent (414) from the Account A 402 to the Account B 404. In some implementations, the message from the Account A 402 to the Account B 404 is an encrypted message (e.g., using the asymmetric encryption described above). In some examples, the message is transmitted over a sub-chain channel (e.g., the sub-chain channel 308 of FIG. 3). In some examples, the (encrypted) message includes the data set [$t_1$, $r_1$, $r_2$, $X_1$, $Z_1$, $X_2$, $Y_2$].

The Account B decrypts the message to reveal the data (e.g., [$t_1$, $r_1$, $r_2$, $X_1$, $Z_1$, $X_2$, $Y_2$]). The ciphertext data is verified (416) by the Account B 404. In some examples, the Account B 404 verifies the ciphertext data by checking whether the ciphertexts $X_1$, $Z_1$, $X_2$, $Y_2$ are correct based on $t_1$, $r_1$, $r_2$ provided by the Account A 402. That is, the Account B recalculates $X_1$, $Z_1$, $X_2$, $Y_2$, and determines whether they are equal to what was received from the Account A 402. If the ciphertexts are not equal, an error can be sent to the Account A, and the transaction ends.

If the ciphertexts are verified, the Account B 404 generates (418) a range proof ($RP_B$). In some implementations, the range proof ($RP_B$) is a zero-knowledge proof (ZKP) that can be used to confirm whether the Account B 404 has sufficient funds to perform the exchange transaction. For example, the range proof ($RP_B$) can be generated to prove the following:

$$s_{B_2} - t_2 \geq 0$$

In some examples, the Account B 404 provides a first balance ciphertext, and a second balance ciphertext, respectively as:

$$(PC(s_{B_1},\bar{r}_{B_1}),BGN_B(s_{B_1},\bar{r}_{B_1}))$$

$$(PC(s_{B_2},\bar{r}_{B_2}),BGN_B(s_{B_2},\bar{r}_{B_2}))$$

where $\bar{r}_{B_1}$ and $\bar{r}_{B_2}$ are random numbers provided by the Account B 404. In some examples, the Account B 404 provides an exchange ciphertext as:

$$(E',E'')=(PC(\beta,\gamma),BGN_B(\beta,\gamma))$$

where $\gamma$ is a random number generated by the Account B 404, and is shared with other accounts (e.g., provided to the Account A 402 with the exchange rate ($\beta$)).

An evidence set (EX) is generated (420), which can be used to verify the private exchange rate ($\beta$). In some implementations, the evidence set (EX) of the exchange rate is provided as:

$$EX=(U,V,t'',\tilde{r}'',\hat{r}'')$$

In some examples, U and V are respectively calculated as:

$$U=e(P_B,P_B)^{t'}e(P_B,Q_B)^{\tilde{r}} \text{ and } V=e(P_B,P_B)^{t'}e(P_B,Q_B)^{\hat{r}}$$

where $P_B$ and $Q_B$ are provided in $PK_{BGN\_A}$, and t', $\tilde{r}$, and $\hat{r}$ are random numbers generated by the Account B 404. In some examples, t'', $\tilde{r}''$, $\hat{r}''$ are respectively calculated as:

$$t''=t'+yt_2$$

$$\tilde{r}''=\tilde{r}'+y\tilde{r}$$

$$\hat{r}''=\hat{r}'+y\hat{r}$$

where y=Hash(U, V), and $\tilde{r}$ and $\hat{r}$ are respectively calculated as:

$$\tilde{r}=\beta t_1+t_1\gamma+\gamma r_1 q_B \alpha_B$$

$$\hat{r}=2t_2+r_2 q_B \alpha_B$$

In some examples, Hash can be provided as any appropriate hashing function that is publicly known to participants, including consensus nodes, in the blockchain network (e.g., SHA-256).

In some implementations, the Account B 404 returns (422) an encrypted message back to the Account A 402, which includes the following example data set:

$(X_1, Z_1, X_2, Y_2; RP_B, EX; Sig_B)$ where $Sig_B$ is the digital signature of the Account B 404. In some examples, the message is transmitted over a sub-chain channel (e.g., the sub-chain channel 308 of FIG. 3).

The Account A 402 generates (424) a range proof ($RP_A$) that serves as a ZKP that the transaction is for some value, and that the Account A 402 has sufficient assets to conduct the transaction. In other terms, the range proof ($RP_A$) can be used to prove that:

$$t_1 \geq 0, \text{ and } s_A-t_1 \geq 0$$

The Account A 404 generates (426) sub-transactions including a first sub-transaction from the Account A 402 to the Account B 404 for the amount ($t_1$), and a second sub-transaction from the Account B 404 to the Account C for the amount ($t_2$). In some examples, the Account A generates random numbers (t', r') and provides a set of ciphertexts as:

$$(X',Y',Z')=(PC(t',r'),BGN_A(t',r'),BGN_B(t',r'))$$

The Account A provides a data set (PF) as:

$$PF=(X',Y',Z';t'_1,r'_1,t'_2,r'_2)$$

where:

$$t'_1=t'+xt_1, r'_1=r'+xr_1, t'_2=t'+xt_2, \text{ and } r'_2=r'+xr_2$$

where:

$$x=Hash(X',Y',Z')$$

The Account A 402 provides the first and second sub-transactions respectively as:
A, B: $X_1, Y_1, Z_1$
B, C: $X_2, Y_2, Z_2$ where A is an identifier of the Account A 402, B is an identifier of the Account B 404, and C is an identifier of the Account C (e.g., the identifiers are provided as respective addresses within the blockchain network). A transaction is provided, which includes the first and second sub-transactions, range proofs, and supporting evidence sets. For example, the transaction is provided as:

A, B: X, $Y_1, Z_1$; B, C: $X_2$, Y, $Z_2$; $RP_A$, PF; $RP_B$, EX

The transaction is digitally signed (428) by the Account A 402, and includes both the signature of the Account A 402 ($Sig_A$), and the signature of the Account B 404 ($Sig_B$). The Account A 402 submits (430) the signed transaction to the consensus node 406. The signed transaction can be provided as:

(A, B: $X_1, Y_1, Z_1$; B, C: $X_2, Y_2, Z_2$; $RP_A$, PF; $RP_B$, EX; $Sig_A, Sig_B$)

The consensus node 406 verifies (432) the signatures of the Account A 402 and of the Account B 404. If the signatures are not verified, the transaction ends, and an error message can be provided to the Account A 402. If the signatures are verified, the range proof ($RP_A$) and the range proof ($RP_B$) are verified (434) by the consensus node 406. Because the range proofs are ZKPs, each can be proven as true, or return false without revealing the underlying plaintext data. If the range proofs are not verified, the transaction ends, and an error message can be provided to the Account A 402. If the range proofs are verified, it is determined that the transaction amount is greater than 0, and that both the Account A 402, and the Account B 404 have sufficient assets in the respective currencies to conduct the transactions.

In some implementations, the consensus node 406 verifies (436) the transaction, by using evidence in the data set (PF), and the evidence set (EX). In some examples, the consensus node 406 verifies whether the following relationships are true:

$$PC(t'_1,r'_1)=X'+xX_1$$

$$BGN_A(t'_1,r'_1)=Y'+xY_1$$

$$BGN_B(t'_1,r'_1)=Z'+xZ_1$$

$$PC(t'_1,r'_1)=X'+xX_2$$

$$BGN_B(t'_2,r'_2)=Y'+xY_2$$

$$BGN_C(t'_2,r'_2)=Z'+xZ_2$$

where x=Hash(X', Y', Z'). If the above relationships are true, it is confirmed that the ciphertext (BGN ciphertext) is encrypted with the appropriate public key, and the amounts of the transaction are correct.

It is also verified that the transaction is conducted at the published (although encrypted) exchange rate. For example, the consensus node 406 verifies the exchange rate by using evidence in the data set (EX). In some examples, the consensus node 406 calculates y=Hash(U, V), and uses y to verify whether the following relationships are true:

$$e(P_B,P_B)^{t''}e(P_B,Q_B)^{\tilde{r}''}=U^*e(E_2,Z_1)^y$$

$$e(P_B,P_B)^{t''}e(P_B,Q_B)^{\hat{r}''}=V^*e(BGN_B(1,1),Y_2)^y$$

If the relationships are not true, the transaction, and/or exchange rate are not verified, the transaction ends, and an error message can be provided to the Account A 402. If the relationships are not true, the consensus node 406 records (438) the transaction is recorded to the consortium blockchain network, and account balances of the Account A 402, the Account B 404, and the Account C are updated. For example, the balance ($s_A$) of the Account A 402 is decreased by the amount ($t_1$), the balance ($s_{B_1}$) of the Account B 404 is increased by the amount ($t_1$), the balance ($s_{B_2}$) of the Account B 404 is decreased by the amount ($t_2$), and a balance of the Account C is increased by the amount ($t_2$).

Figure 5:
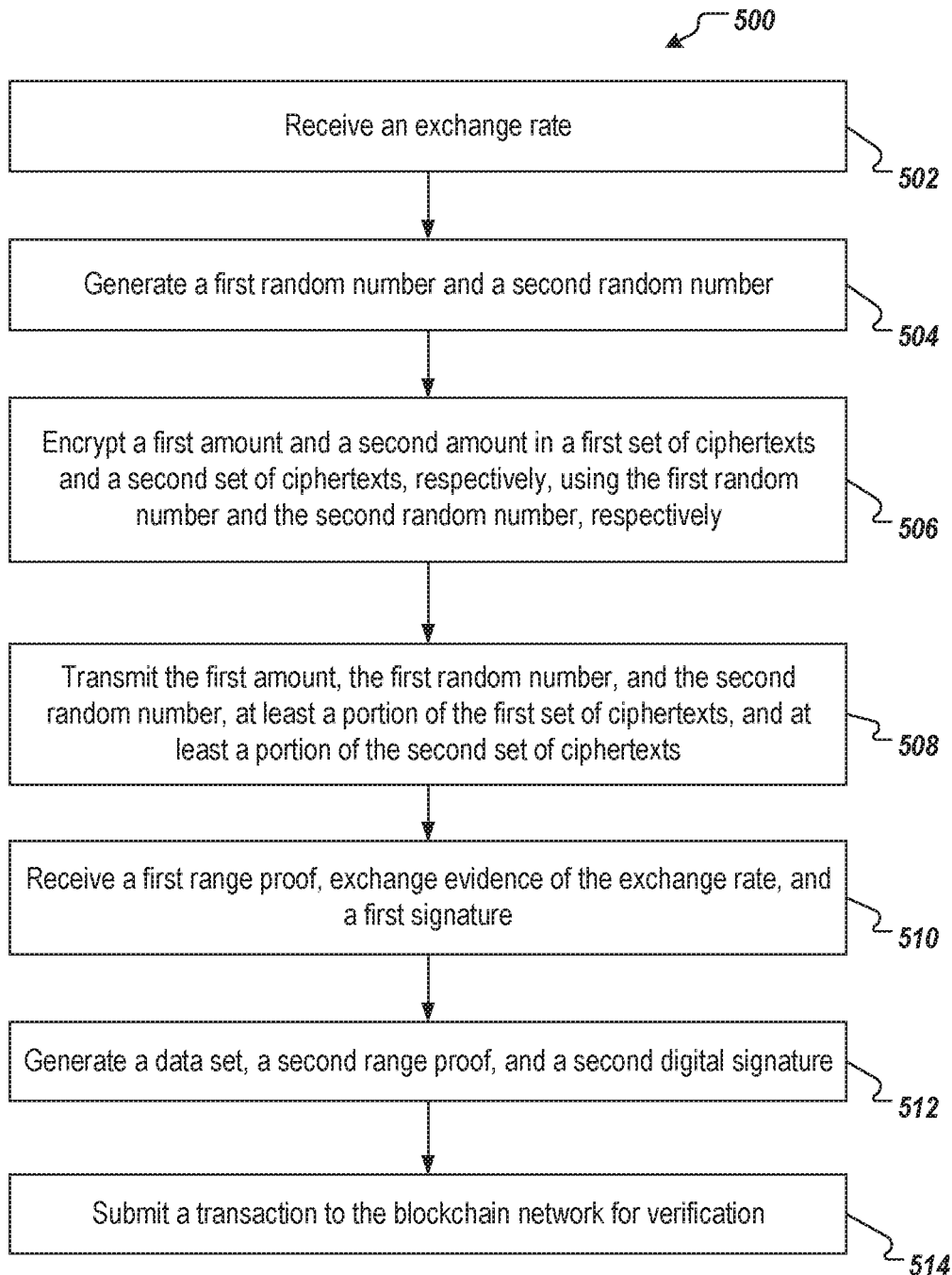
FIG. 5 depicts an example of a process that can be executed in accordance with implementations of this specification.

FIG. 5 depicts an example of a process 500 that can be executed in accordance with implementations of this specification. In some implementations, the example process 500 may be performed using one or more computer-executable programs executed using one or more computing devices. In some examples, the example process 500 can be performed by nodes of a consortium blockchain network to conduct cross-asset transactions within a blockchain network.

An exchange rate is received (502). For example, an exchange rate is received by a first node associated with a first participant in a blockchain network (e.g. a node of the blockchain network), from a second node associated with a second participant in the blockchain network (e.g. a node of the blockchain network). In some examples, the exchange rate is received through a sub-chain channel. In some examples, the exchange rate is a private exchange rate of the second participant. In some implementations, the second participant is a financial institution. In some implementations, the exchange rate specifies a rate, at which the second participant exchanges a first type of currency for a second type of currency. For example, the exchange rate may specify the rate at which the second participant will exchange USD for RMB.

A first random number and a second random number are generated by the first node (504). A first amount and a second amount are encrypted within a first set of ciphertexts and a second set of ciphertexts, respectively, using the first random number and the second random number, respectively (506). In some examples, the first amount is an amount of a first asset type to be transferred by the first participant to the participant member for exchange. In some examples, the second amount is the amount of a second asset type to be exchanged for the first amount. In some examples, the second amount is equal to the product of the first amount multiplied by the exchange rate of the second participant.

In some examples, the first set of ciphertexts include a random number commitment of the first amount and the first random number and two homomorphic encryptions of the first amount and the first random number. In some examples, the second set of ciphertexts includes a random number commitment of the second amount and the second random number and two homomorphic encryptions of the second amount and the second random number. In some examples, the first set of ciphertexts includes a PC of the first amount and the first random number, and BGN encryptions of the first amount and the first random number using the BGN public key of the first participant and the BGN public key of the second participant, respectively. In some examples, the second set of ciphertexts includes a PC of the second amount and the second random number, and BGN encryptions of the second amount and the second random number using the BGN public key of the second participant and the BGN public key of a third participant, respectively.

The first amount, the first random number, the second random number, and at least a portion (sub-set) of the first set of ciphertexts, and at least a portion (sub-set) of the second set of ciphertexts are transmitted from the first node to the second node (508). In some implementations, the first amount, the first random number, the second random number, the at least a portion of the first set of ciphertexts, and the at least a portion of the second set of ciphertexts are transmitted through the sub-chain channel.

A first range proof, an evidence set of the exchange rate, and a first signature are received (510). In some implementations, the first range proof, the evidence set of the exchange rate, and a first signature are received by the first node from the second node over the sub-chain channel. In some examples, the first digital signature is the digital signature of the second participant based on an asymmetric encryption scheme. In some examples, the first range proof provides evidence that an account associated with the second member has sufficient funds of the same asset type as the second amount to exchange the first amount for the second amount.

A data set, a second range proof, and a second digital signature are generated (512). In some examples, the data set is used within the blockchain network to at least partially confirm authenticity of the cross-asset transaction. In some examples, the second digital signature is the digital signature of the first participant based on the asymmetric encryption scheme. In some examples, the second range proof provides evidence that an account associated with the first participant has sufficient funds of the same asset type as the first amount to transfer the first amount to the second participant, and that the first amount is not negative.

A transaction is submitted to the blockchain network for verification (514). In some implementations, the transaction submitted by the first node to the blockchain network includes the first set of ciphertexts, the second set of ciphertexts, the first range proof, the data set, the second range proof, the evidence set of the exchange rate, the first digital signature, and the second digital signature. In some implementations, at least one consensus node within the blockchain network verifies the signatures, and the range proofs. In some implementations, the at least one consensus node verifies the transaction without the transaction data (e.g., the first amount, the second amount, the exchange rate) being revealed. In some implementation, in response to successful verification of the transaction, the transaction is executed within the blockchain network. In some examples, the accounts of the first participant and the second participant are updated on the blockchain to reflect the exchanged assets. In some examples, an account of the third participant is updated to reflect receipt of the second amount.

Figure 6:
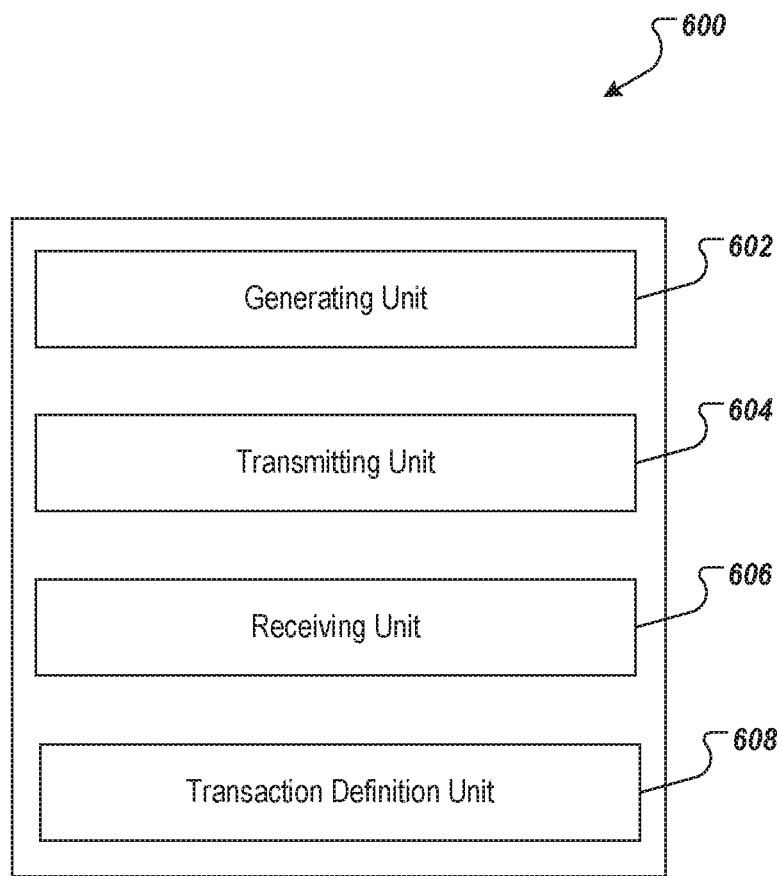
FIG. 6 depicts examples of modules of an apparatus in accordance with implementations of this specification.

FIG. 6 is a diagram of on example of modules of an apparatus 600 in accordance with implementations of this specification. The apparatus 600 can be an example implementation of a blockchain node configured to participate in private cross-asset trading in a blockchain network, wherein the blockchain network is a consortium blockchain network. The apparatus 600 can correspond to the implementations described above, and the apparatus 600 includes the following:

A generating unit 602 generates, using BGN encryption, ciphertexts based on a first value, and a second value, the second value being determined based on the first value and an exchange rate provided by a second node in the blockchain network. A transmitting unit 604 transmits the first value and the ciphertexts to a second node. A receiving unit 606 receives a first evidence set including a set of data that can be used to verify the exchange rate in a ZKP routine without revealing the exchange rate. The generating unit 602 generates a second evidence set including a set of data that can be used to verify, using the ZKP routine, that the ciphertexts are encrypted by a BGN public key.

A transaction definition 608 unit defines a transaction that includes a first transaction between the first node and the second node for transfer of the first value from the first node to the second node, and a second transaction between the second node and a third node for transfer of the second value from the second node to the third node. The transmitting unit 604 transmits the transaction to at least one consensus node of the blockchain network for verification and execution of the transaction. As described herein, the transaction can be verified based on the first evidence set, and the second evidence set. In response to verifying the transaction, the consensus node executes the first transaction and the second transaction to decrease a balance of the first node by the first value, increase a first balance of the second node by the first value, decrease a second balance of the second node by the second value, and increase a balance of the third node by the second value.

In an optional implementation, the first evidence set is provided by the second node based on the first value, a pair of random numbers provided by the first node, and the ciphertexts.

In an optional implementation, verifying the transaction by the consensus node includes verifying a digital signature of the first node and a digital signature of the second node.

In an optional implementation, verifying the transaction by the consensus node includes verifying a first range proof provided by the first node and a second range proof provided by the second node.

In an optional implementation, the first range proof includes a ZKP to prove that the first value is greater than zero, and that the balance of the first node is greater than or equal to the first value.

In an optional implementation, the second range proof includes a ZKP to prove that the second balance of the second node is greater than or equal to the second value.

In an optional implementation, the transaction further includes a data set including a set of ciphertexts generated at least partially based on BGN encryption, the data set being used to verify the transaction by the at least one consensus node.

In an optional implementation, the receiving unit 606 receives the exchange rate from the second node through a sub-chain channel of the blockchain network.

In an optional implementation, at least one ciphertext of the ciphertexts is provided using PC.

In an optional implementation, the set of data of the first evidence set includes a first data value and a second data value, each of the first data value and the second data value being determined based on parameters used to generate a BGN public key of the second node.

In an optional implementation, the set of data of the second evidence set includes a set of ciphertexts and a set of values, each value in the set of values being at least partially based on a hash of the set of ciphertexts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of this application without creative efforts.

Referring again to FIG. 6, it can be interpreted as illustrating an internal functional module and a structure of a private cross-asset trading apparatus. The private cross-asset trading apparatus can be an example of a blockchain node configured to participate in private cross-asset trading within the blockchain network. An execution body in essence can be an electronic device, and the electronic device includes the following: one or more processors; and a memory configured to store an executable instruction of the one or more processors.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for private cross-asset trading in a blockchain network, the method being executed by one or more processors and comprising:
    receiving, by a first node in a blockchain network from a second node in the blockchain network via a sub-channel outside of the blockchain network, a private currency exchange rate;
    generating, by the first node in the blockchain network and using Boneh-Goh-Nissim (BGN) encryption, first ciphertexts based on a first value and a second value, the second value being determined based on a product of the first value and the private currency exchange rate;
    transmitting, by the first node to the second node via the sub-channel outside of the blockchain network, the first value and the first ciphertexts;
    receiving, by the first node and from the second node via the sub-channel outside of the blockchain network, a first evidence set comprising a first set of data that includes evidence of the private currency exchange rate and evidence of the first ciphertexts;
    verifying the private currency exchange rate in a zero-knowledge proof (ZKP) routine using the first evidence set comprising the first set of data without revealing the private currency exchange rate;
    generating, by the first node, a second evidence set comprising a second set of data that includes second ciphertexts;
    verifying, using the second evidence set comprising the second set of data and the ZKP routine, that the second ciphertexts are encrypted by a BGN public key of the first node;
    defining, by the first node, a transaction comprising a first transaction between the first node and the second node for transfer of the first value from the first node to the second node, and a second transaction between the second node and a third node for transfer of the second value from the second node to the third node;
    transmitting, by the first node via the blockchain network, the transaction to at least one consensus node of the blockchain network for verification and execution of the transaction, the transaction being verified based on the first evidence set and the second evidence set; and
    in response to verifying the transaction, executing the first transaction between the first node and the second node to decrease a balance of the first node by the first value and increase a first balance of the second node by the first value, and executing the second transaction, based upon the private currency exchange rate, between the second node and the third node to decrease a second balance of the second node by the second value and increase a balance of the third node by the second value.

2. The method of claim 1, wherein the first evidence set is provided by the second node based on the first value, a pair of random numbers provided by the first node, and the first ciphertexts.

3. The method of claim 1, wherein verifying the transaction by the at least one consensus node comprises verifying a digital signature of the first node and a digital signature of the second node.

4. The method of claim 1, wherein verifying the transaction by the at least one consensus node comprises verifying a first range proof provided by the first node and a second range proof provided by the second node.

5. The method of claim 4, wherein the first range proof comprises a ZKP to prove that the first value is greater than zero, and that the balance of the first node is greater than or equal to the first value.

6. The method of claim 4, wherein the second range proof comprises a ZKP to prove that the second balance of the second node is greater than or equal to the second value.

7. The method of claim 1, wherein the transaction further comprises a data set comprising a set of ciphertexts generated using BGN encryption, the data set being used to verify the transaction by the at least one consensus node.

8. The method of claim 1, wherein at least one ciphertext of the first ciphertexts and the second ciphertexts is provided using Pedersen Commitment.

9. The method of claim 1, wherein the first set of data of the first evidence set comprises a first data value and a second data value, each of the first data value and the second data value being determined based on parameters used to generate a BGN public key of the second node.

10. The method of claim 1, wherein the second set of data of the second evidence set comprises a set of the second ciphertexts and a set of values, each value in the set of values being based on a hash of the set of the second ciphertexts.

11. A non-transitory, computer-readable medium storing one or more instructions executable by a computer system to perform operations comprising:
    receiving, by a first node in a blockchain network from a second node in the blockchain network via a sub-channel outside of the blockchain network, a private currency exchange rate;
    generating, by the first node in the blockchain network and using Boneh-Goh-Nissim (BGN) encryption, first ciphertexts based on a first value and a second value, the second value being determined based on a product of the first value and the private currency exchange rate;
    transmitting, by the first node to the second node via the sub-channel outside of the blockchain network, the first value and the first ciphertexts;
    receiving, by the first node and from the second node via the sub-channel outside of the blockchain network, a first evidence set comprising a first set of data that includes evidence of the private currency exchange rate and evidence of the first ciphertexts;
    verifying the private currency exchange rate in a zero-knowledge proof (ZKP) routine using the first evidence set comprising the first set of data without revealing the private currency exchange rate;
    generating, by the first node, a second evidence set comprising a second set of data that includes second ciphertexts;
    verifying, using the second evidence set comprising the second set of data and the ZKP routine, that the second ciphertexts are encrypted by a BGN public key of the first node;
    defining, by the first node, a transaction comprising a first transaction between the first node and the second node for transfer of the first value from the first node to the second node, and a second transaction between the second node and a third node for transfer of the second value from the second node to the third node;

transmitting, by the first node via the blockchain network, the transaction to at least one consensus node of the blockchain network for verification and execution of the transaction, the transaction being verified based on the first evidence set and the second evidence set; and in response to verifying the transaction, executing the first transaction between the first node and the second node to decrease a balance of the first node by the first value and increase a first balance of the second node by the first value, and executing the second transaction, based upon the private currency exchange rate, between the second node and the third node to decrease a second balance of the second node by the second value and increase a balance of the third node by the second value.

12. The non-transitory, computer-readable medium of claim 11, wherein the first evidence set is provided by the second node based on the first value, a pair of random numbers provided by the first node, and the first ciphertexts.

13. The non-transitory, computer-readable medium of claim 11, wherein verifying the transaction by the at least one consensus node comprises verifying a digital signature of the first node and a digital signature of the second node.

14. The non-transitory, computer-readable medium of claim 11, wherein verifying the transaction by the at least one consensus node comprises verifying a first range proof provided by the first node and a second range proof provided by the second node.

15. The non-transitory, computer-readable medium of claim 14, wherein the first range proof comprises a ZKP to prove that the first value is greater than zero, and that the balance of the first node is greater than or equal to the first value.

16. The non-transitory, computer-readable medium of claim 14, wherein the second range proof comprises a ZKP to prove that the second balance of the second node is greater than or equal to the second value.

17. The non-transitory, computer-readable medium of claim 11, wherein the transaction further comprises a data set comprising a set of ciphertexts generated using BGN encryption, the data set being used to verify the transaction by the at least one consensus node.

18. The non-transitory, computer-readable medium of claim 11, wherein at least one ciphertext of the first ciphertexts and the second ciphertexts is provided using Pedersen Commitment.

19. The non-transitory, computer-readable medium of claim 11, wherein the first set of data of the first evidence set comprises a first data value and a second data value, each of the first data value and the second data value being determined based on parameters used to generate a BGN public key of the second node.

20. The non-transitory, computer-readable medium of claim 11, wherein the second set of data of the second evidence set comprises a set of the second ciphertexts and a set of values, each value in the set of values being based on a hash of the set of the second ciphertexts.

21. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a first node in a blockchain network from a second node in the blockchain network via a sub-channel outside of the blockchain network, a private currency exchange rate;

generating, by the first node in the blockchain network and using Boneh-Goh-Nissim (BGN) encryption, first ciphertexts based on a first value and a second value, the second value being determined based on a product of the first value and the private currency exchange rate;

transmitting, by the first node to the second node via the sub-channel outside of the blockchain network, the first value and the first ciphertexts;

receiving, by the first node and from the second node via the sub-channel outside of the blockchain network, a first evidence set comprising a first set of data that includes evidence of the private currency exchange rate and evidence of the first ciphertexts;

verifying the private currency exchange rate in a zero-knowledge proof (ZKP) routine using the first evidence set comprising the first set of data without revealing the private currency exchange rate;

generating, by the first node, a second evidence set comprising a second set of data that includes second ciphertexts;

verifying, using the second evidence set comprising the second set of data and the ZKP routine, that the second ciphertexts are encrypted by a BGN public key of the first node;

defining, by the first node, a transaction comprising a first transaction between the first node and the second node for transfer of the first value from the first node to the second node, and a second transaction between the second node and a third node for transfer of the second value from the second node to the third node;

transmitting, by the first node via the blockchain network, the transaction to at least one consensus node of the blockchain network for verification and execution of the transaction, the transaction being verified based on the first evidence set and the second evidence set; and in response to verifying the transaction, executing the first transaction between the first node and the second node to decrease a balance of the first node by the first value and increase a first balance of the second node by the first value, and executing the second transaction, based upon the private currency exchange rate, between the second node and the third node to decrease a second balance of the second node by the second value and increase a balance of the third node by the second value.

22. The computer-implemented system of claim 21, wherein the first evidence set is provided by the second node based on the first value, a pair of random numbers provided by the first node, and the first ciphertexts.

23. The computer-implemented system of claim 21, wherein verifying the transaction by the at least one consensus node comprises verifying a digital signature of the first node and a digital signature of the second node.

24. The computer-implemented system of claim 21, wherein verifying the transaction by the at least one consensus node comprises verifying a first range proof provided by the first node and a second range proof provided by the second node.

25. The computer-implemented system of claim 24, wherein the first range proof comprises a ZKP to prove that the first value is greater than zero, and that the balance of the first node is greater than or equal to the first value.

26. The computer-implemented system of claim 24, wherein the second range proof comprises a ZKP to prove that the second balance of the second node is greater than or equal to the second value.

27. The computer-implemented system of claim 21, wherein the transaction further comprises a data set comprising a set of ciphertexts generated using BGN encryption, the data set being used to verify the transaction by the at least one consensus node.

\* \* \* \* \*